(12) United States Patent
Arriola et al.

(10) Patent No.: US 10,482,121 B2
(45) Date of Patent: Nov. 19, 2019

(54) USER INTERFACE FOR ACCESSING GAMES

(71) Applicant: SONY INTERACTIVE ENTERTAINMENT LLC, San Mateo, CA (US)

(72) Inventors: George Arriola, San Francisco, CA (US); Carsten Schwesig, San Francisco, CA (US); Brian Johnson, San Francisco, CA (US); Michael Bauerly, San Francisco, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 716 days.

(21) Appl. No.: 13/659,750

(22) Filed: Oct. 24, 2012

(65) Prior Publication Data

US 2013/0055162 A1 Feb. 28, 2013

Related U.S. Application Data

(63) Continuation-in-part of application No. 13/442,525, filed on Apr. 9, 2012, now Pat. No. 9,779,097.
(Continued)

(51) Int. Cl.
G06F 3/048 (2013.01)
G06F 16/44 (2019.01)

(52) U.S. Cl.
CPC .................................. *G06F 16/44* (2019.01)

(58) Field of Classification Search
None
See application file for complete search history.

(56) References Cited

U.S. PATENT DOCUMENTS

| | | | | |
|---|---|---|---|---|
| 5,706,449 A | * | 1/1998 | Liu | G06F 3/0481 707/999.007 |
| 2003/0142125 A1 | * | 7/2003 | Salmimaa et al. | G06F 3/04817 715/733 |

(Continued)

FOREIGN PATENT DOCUMENTS

| | | |
|---|---|---|
| EP | 2463862 A1 | 6/2012 |
| WO | WO2009099695 | 8/2009 |

OTHER PUBLICATIONS

Ryan Paul: "Hands-on: Reading e-books on Android with Aldiko", Oct. 23, 2010 (Oct. 23, 2010), XP002717499, Retrieved from the Internet: URL: http://arstechnica.com/information-technology/201 O/O9/handson-reading-e-books-on-android-with-aldkio / [retrieved on Dec. 5, 2013].

*Primary Examiner* — William C Trapanese
(74) *Attorney, Agent, or Firm* — Trellis IP Law Group, PC (57) ABSTRACT

A system and method for employing a user interface to facilitate user access to games. The example method includes displaying a band of plural adjacent tiles, wherein each tile represents a game, and wherein the band is scrollable in response to a specific user input; and arranging adjacent tiles based on a sorting rule, wherein the sorting rule includes arranging each tile according to a time of use and/or a time of download of a game associated with each tile. In a more specific embodiment, the method further includes illustrating, via the adjacent tiles, one or more games corresponding to one or game recommendations obtained in response to accessing a social network associated with a user of the user interface. Menu selections can allow access to recommendations; access to related games; access to games based on social network usage, and so on.

20 Claims, 7 Drawing Sheets

Related U.S. Application Data

(60) Provisional application No. 61/518,152, filed on Apr. 28, 2011.

(56) References Cited

U.S. PATENT DOCUMENTS

| | | | |
|---|---|---|---|
| 2005/0037814 A1* | 2/2005 | Yasui | G06F 1/1616 455/566 |
| 2005/0039110 A1 | 2/2005 | De La Vega | |
| 2006/0288308 A1* | 12/2006 | Enomoto et al. | 715/811 |
| 2007/0028268 A1 | 2/2007 | Ostojic | |
| 2008/0034374 A1* | 2/2008 | Davis | G06F 17/30265 719/314 |
| 2009/0177966 A1 | 7/2009 | Chaudhri | |
| 2009/0240732 A1* | 9/2009 | Amidon | G11B 27/105 |
| 2009/0318310 A1 | 12/2009 | Liu | |
| 2010/0153017 A1 | 6/2010 | De La Vega | |
| 2010/0175026 A1* | 7/2010 | Bortner et al. | 715/818 |
| 2010/0313166 A1 | 12/2010 | Nakayama | |
| 2012/0151351 A1* | 6/2012 | Kilroy et al. | 715/733 |
| 2012/0254854 A1* | 10/2012 | Evans | A63F 13/12 717/173 |
| 2012/0324383 A1* | 12/2012 | Tremblay | 715/765 |

\* cited by examiner

USER INTERFACE FOR ACCESSING GAMES

CLAIM OF PRIORITY

This application is a continuation-in-part of the following application, U.S. patent application Ser. No. 13/442,525, entitled PLATFORM AGNOSTIC UI/UX AND HUMAN INTERACTION PARADIGM, filed on Apr. 9, 2012, which is hereby incorporated by reference as if set forth in full in this application for all purposes, and which claims priority from U.S. Provisional Patent Application Ser. No. 61/518,152, entitled GENOME PLATFORM AGNOSTIC UI/UX AND HUMAN INTERACTION PARADIGM, filed on Apr. 28, 2011, which is hereby incorporated by reference as if set forth in full in this application for all purposes.

BACKGROUND OF THE INVENTION

This invention is related in general to software and more specifically relates to user interfaces and accompanying methods for facilitating user access to and interaction with software games.

User interfaces for accessing games are employed in various demanding applications including game consoles, desktop and mobile device operating systems, Web-based gaming portals, and so on. Such user interfaces often demand user friendly mechanisms for facilitating expedient access to desired games.

In an example conventional user interface, users access games that have been installed on a computer by selecting an icon or button from a desktop display or by navigating a menu of installed game programs. However, such conventional user interfaces often lack effective features for optimally organizing games and related game information to facilitate rapid and efficient access thereto.

SUMMARY OF EMBODIMENTS OF THE INVENTION

An example method employs a user interface to facilitate user access to games and related content. The example method includes displaying a band of plural adjacent tiles, also called a strand, wherein each tile represents a game, and wherein the band is scrollable in response to a specific user input; and arranging adjacent tiles based on a sorting rule, wherein the sorting rule includes arranging each tile in the band in accordance with a time of use and/or time of download of a game associated with each tile in the band.

In a more specific embodiment, the method further includes illustrating, via the adjacent tiles, one or more games corresponding to one or game recommendations obtained in response to accessing a social network associated with a user of the user interface. The specific embodiment further includes presenting a first menu pertaining to the band in response to a first user input applied to a header or other region about the band of plural adjacent tiles, which are arranged horizontally in the band.

The sorting rule includes positioning a most recently accessed game in a prominent position in the band. The prominent position includes the leftmost position. The sorting rule further includes positioning a downloaded but not accessed game in a leftmost position in the band, and positioning a most recently accessed game adjacent to the downloaded but not accessed game.

The specific embodiment further includes displaying a second menu pertaining to a particular selected a game in response to a second user input, wherein the second user input indicates user selection of a tile representing the game. A first user option enables user access to a collection of recommendations of electronic media, such as recommended games, based on one or more games that have been accessed by a user of the user interface. Game recommendations may be based on a frequency of user access to one or more games accessible via the user interface. Game recommendations may also be based on a rating of the one or more games, wherein the rating is derived from a social network employed by a user of the user interface. For example, certain social networks may provide mechanisms for rating games, and such ratings may be employed to generate the game recommendations. Game recommendations may also include recommendations from a commercial entity, such as the Sony OnLine Store (SOLS).

The specific embodiment further includes presenting each tile of the band of tiles with cover art pertaining to each game represented by a tile. The second menu may include one or more user options for accessing metadata associated with a game. A third user option, which may be provided via a swoggle user interface control, enables a user to selectively change the second menu. The second menu may include an additional user option to display identifications of games, such as game titles, that members of a social network of a user have played. The second menu may also include a user option to display identifications of games that are similar to a game that a user has selected via the band of tiles. An instance of a game may be activated in response to user selection of an enlarged tile resulting from user selection of a corresponding tile from the band of tiles.

Hence, certain embodiments discussed herein may facilitate user access to desired games by conveniently arranging games in a scrollable band of tiles, i.e., strand, wherein the games are arranged in accordance with a likelihood that a user will wish to access the game, e.g., in accordance with a time of use or download. Furthermore, by selectively accessing social networks, commercial entities, and so on, a user may be provided with efficient access to games that a user may wish to play, and which would be relatively cumbersome to discover and access without use of certain embodiments discussed herein. In addition, use of the strand and accompanying tiles and features associated therewith may enable expedient and efficient to data related to various games that may be of interest to a user. Furthermore, enabling convenient placement of commercial recommendations in a strand may facilitate ecommerce.

A further understanding of the nature and the advantages of particular embodiments disclosed herein may be realized by reference of the remaining portions of the specification and the attached drawings.

DETAILED DESCRIPTION OF EMBODIMENTS OF THE INVENTION

For the purposes of the present discussion, a game, also called electronic games herein, may be any software or electronic media that includes scoring or other goal or competitive scenario or play. Examples of electronic games include electronic puzzles, challenges, competitions, video games, and so on. A game is said to be accessed if the game's software code is run or executed, e.g., if the game is played.

Games represent a type of electronic media. In general, electronic media may include any digitally stored and computer-accessible content and/or computer code, including movies, electronic books, games, music files and applications, other software applications, and so on.

For clarity, certain well-known components, such as hard drives, processors, power supplies, operating systems, Application Programming Interfaces (APIs), Internet Service Providers (ISPs) and so on, have been omitted from the figures. However, those skilled in the art with access to the present teachings will know which components to implement and how to implement them to meet the needs of a given implementation.

Figure 1:
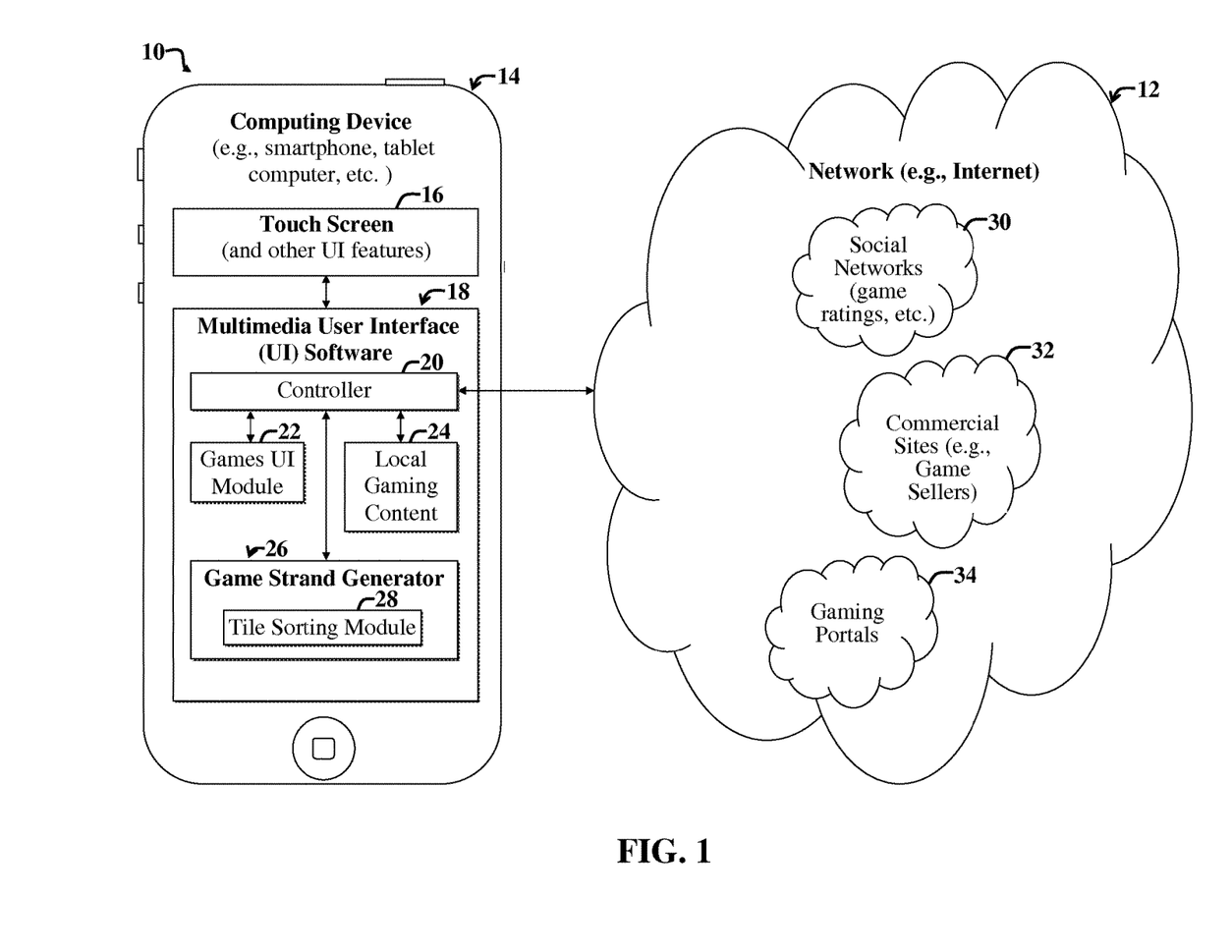
FIG. 1 is a diagram illustrating an example system for facilitating user access to games and related content, such as game recommendations.

FIG. 1 is a diagram illustrating an example system 10 for facilitating user access to gaming content, i.e., games and related content, such as game recommendations. The system 10 includes an electronic computing device such as computing device 14. Computing device 14 can include a desktop computer, game console, or a mobile computing device, such as a tablet, smartphone, etc. The computing device 14, also called a computer herein, communicates with a network 12, such as the Internet, to selectively access gaming content from social networks 30, commercial sites 32 (such as websites of game sellers like the Sony OnLine Store (SOLS)), gaming portals 34, and so on. Gaming content provided via the various sites 30-34 may include game downloads, server-side games, networked games, game ratings, game usage statistics, game recommendations from a user's social network, and so on.

For illustrative purposes, the computing device 16 is shown including a touch screen 16 in communication with multimedia user interface software 18. The multimedia user interface software 18 is adapted to provide various user interface displays and accompanying features for implementing various methods for accessing games, as discussed more fully below.

The example multimedia user interface software 18 includes a controller 20, which includes computer code for coordinating user inputs from the touch screen 16 with various functionality and data implemented via modules 22-28, which communicate therewith. For example, a games user interface module 22 includes computer code for implementing various menus for accessing gaming content. The local gaming content 24 includes downloaded games (e.g., software code for executing game programs), game metadata, and so on.

Figure 7:
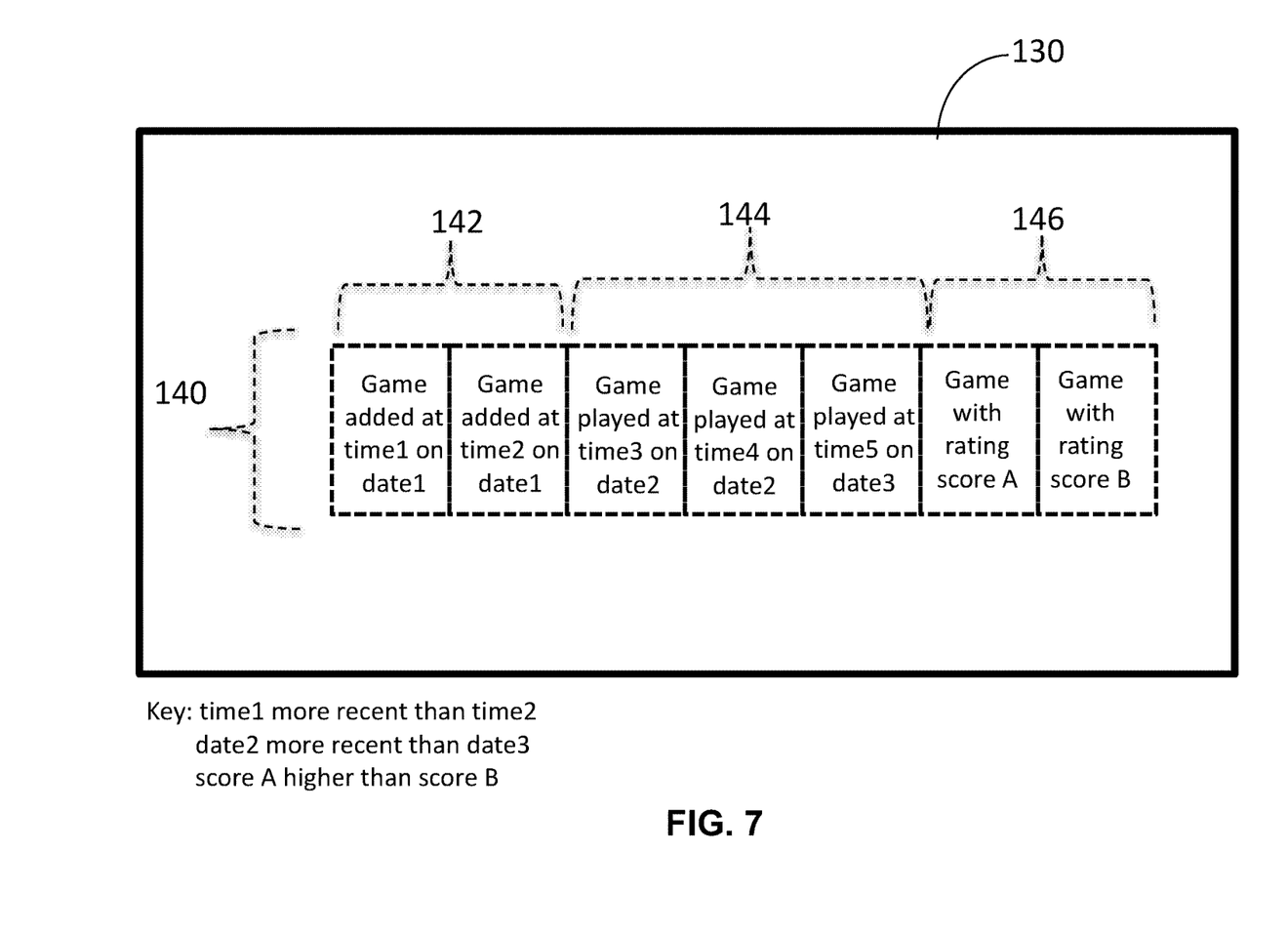
FIG. 7 is a diagram illustrating a fifth example user interface display screen showing a band of tiles displayed in first, second and third groups.

A game strand generator 26 includes computer code for generating displaying bands of tiles, i.e., strands, corresponding to games or other gaming content or groups thereof. The game strand generator 26 includes a tile sorting module 28, which includes computer code for sorting tiles in a strand. The strand generator 26 may be incorporated in the game user interface module 22, without departing from the scope of the present teachings. In a preferred embodiment, illustrated in FIG. 7, the tiles in band 140 on display screen 130 are included and arranged in 3 groups. A first group 142 is sorted according to most recently downloaded or obtained (i.e. "recency" of download). A second group 144 follows the first group and is sorted according to most recently used (e.g., accessed, played or opened). A third group 146 includes recommended games. The recommendations can take into account ratings from a social network, friends' recommendations, etc.

For the purposes of the present discussion, a tile may be any region of a user interface display screen that is distinguished from a surrounding region of the display screen and represents a computing object. A computing object may be any collection of data and/or functionality, such as electronic media, including, but not limited to games, books, movies, and collections or groups thereof. A tile may have certain functionality associated therewith and may act as a user interface control for triggering display of menus, accessing electronic content associated with a tile. Electronic content associated with a tile may include electronic media, e.g., games, books, and so on, and my further include metadata associated with or characterizing or describing the media. However, the tiles discussed herein are primarily associated with games, groups of games, and/or content or information related to games, such as game recommendations or special offers.

For the purposes of the present discussion, the term "recency of use" of electronic media, such as a game, refers to the last time at which the media was accessed, manipulated, or downloaded. Hence, a first game that has just been downloaded but not yet accessed may be considered more recently used than a second game that was previously downloaded and played before the first game was downloaded. "Time of use" is used to compare the times of use of two or more games for purposes of sorting or ranking the games to determine a presentation order in the band. The time of use can be used to sort games so that most recently used are listed first, most recently used are listed last, or by using the time of use in other ways to perform sorting such as by giving a higher ranking to games used in the evening, games used at regular intervals, games used on holidays or birthdays, etc. Similarly a "time of downloading" is used to compare the times of download of two or more games.

The controller 20 may further include computer code for selectively accessing remote content via the network 12, e.g., from the social networks 30, commercial sites 32, gaming portals 34, and so on, in response to certain user input from the touch screen 16 and games user interface module 22.

Hence, the multimedia user interface software 18 is adapted to employ remote gaming content from the network 12, local gaming content 24, and user input via the touch screen 16 in combination with special user interface functionality implemented via the games user interface module 22, to facilitate efficient user access to games and related content, as discussed more fully below.

Figure 2:
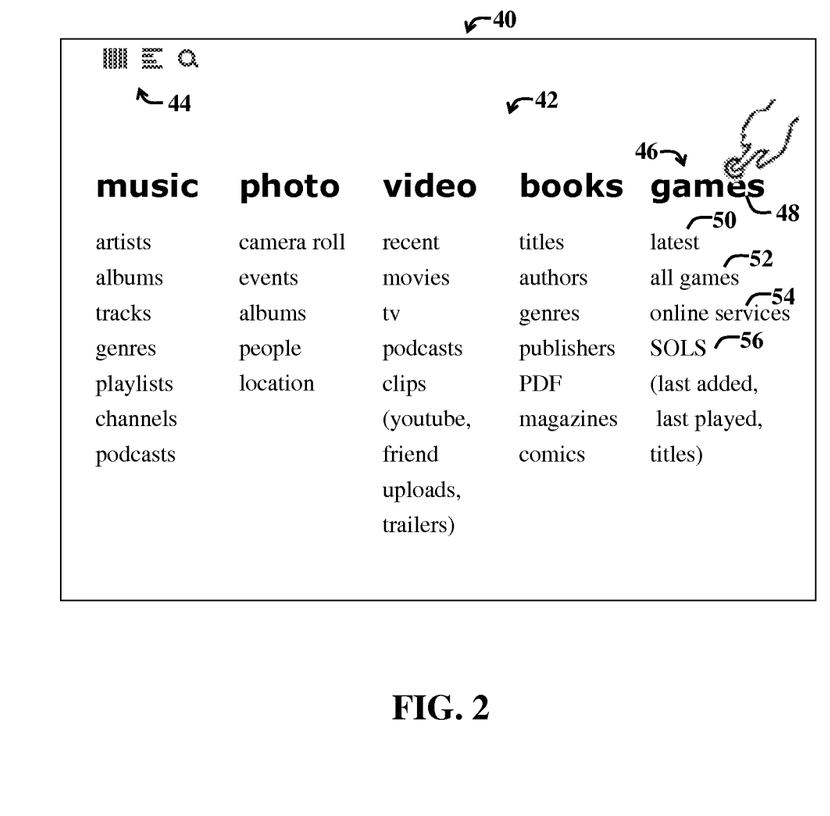
FIG. 2 is a diagram illustrating a first example user interface display screen that includes a main menu for accessing digital content, including a games menu for accessing games and related content.

FIG. 2 is a diagram illustrating a first example user interface display screen 40 that includes a main menu 42 for accessing digital content, including a games menu 46 for accessing games and related content. The example user interface display screen 40 further includes persistent user interface controls 44 for enabling transition from the main menu 42 to a strand view, where various types of multimedia, e.g., music, photos, video, books, and games, may be accessed via different strands; for enabling transition back to the main menu 42, and so on.

For the purposes of the present discussion, a user interface control may be any element displayed via a user interface that is associated with or responsive to a particular user input or set of user inputs to implement a feature or action associated with the user interface. Examples of user interface controls include menu items, buttons, icons, tools in toolbars, search fields, and so on.

The example games menu 46 includes a first games header 48, and various menu items 50-56, including an option to display a user interface screen for accessing the latest or most recent games 50; for accessing or viewing all available games 52; for accessing online services 54, and for accessing one or more commercial sites, such as SOLS 56. Additional or alternative menu items, which may or may not be included in the game menu 46 in practice, include a user options to access a last added game, a last played game, or a list of game titles.

In the present example embodiment, user selection of the games header 48, such as via a single finger tap in the games header 48, may trigger display of a horizontally scrollable band of game tiles, i.e., a game strand, as discussed more fully below.

Figure 3:
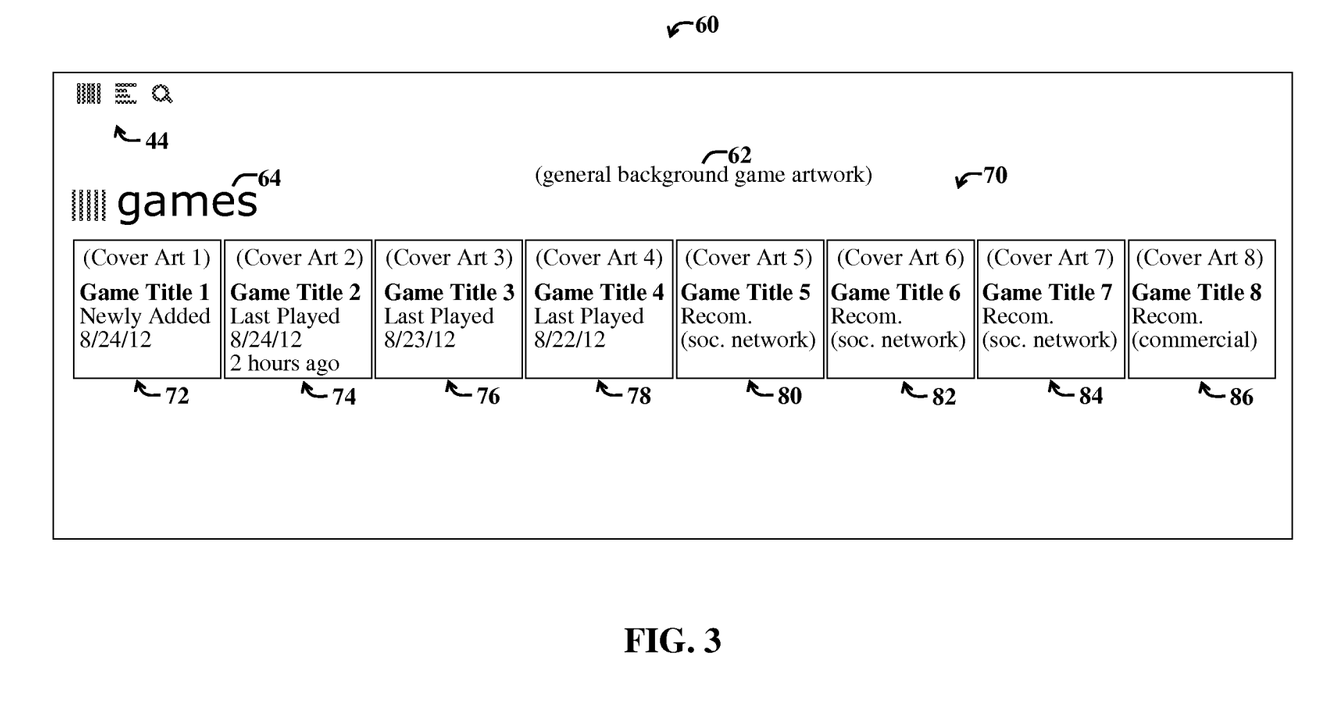
FIG. 3 is a diagram illustrating a second example user interface display screen, which is accessible via the games menu of FIG. 2 and includes a game strand representing a horizontally scrollable band of plural adjacent game tiles.

FIG. 3 is a diagram illustrating a second example user interface display screen 60, which is accessible via the games menu 46 of FIG. 2 and includes a game strand 70 representing a horizontally scrollable bank of plural adjacent tiles 72-86. The strand 70 may be scrolled, e.g., in response to a horizontal finger swipe across the display screen 60. Scrolling may shift the positions of the tiles 72-86 in accordance with the direction of the swipe used to initiate the scroll.

For the purposes of the present discussion, a first tile is said to be adjacent to a second tile if the first tile and second tile are positioned in proximity to each other in a user interface display screen, such that no intervening tiles are displayed between the first tile and the second tile. Hence, tiles that abut each other are considered adjacent, but adjacent tiles do not necessarily abut each other.

The second example user interface display screen 60 shows a second games header 64, which may be selected by a user to trigger display of a menu, as discussed more fully below, e.g., with reference to FIG. 4.

The game strand 70 is overlaid upon background game artwork 62, which is automatically chosen by the underlying user interface software to be representative of one or more games of the game strand 70. Exact methods for choosing the background game artwork 62 are application specific and may be readily determined by those skilled in the art with access to the present teachings, to meet the needs of a given implementation, without undue experimentation.

Each of the adjacent tiles 72-86 include cover art corresponding to or otherwise associated with the game or group of games associated with a given title.

For the purposes of the present discussion, cover art for electronic media may be any artwork or representation of artwork that is employed for marketing electronic media. For example, in certain cases, cover art for a music album may correspond to the artwork displayed on physical copies of a Compact Disc (CD) case or Digital Video Disc (DVD) case. Similarly, cover art for a game may correspond to the artwork displayed on a physical box of container used for marketing games in a store, and/or the game cover art may represent digital artwork used to market a game online.

In the present example, embodiment, the tiles 72-86 of the strand 70 are arranged according to recency of use, from left to right. In particular, a game title, such as represented via the first game tile 72, which has been newly downloaded or otherwise added to or logged with the underlying user interface software, but which has not yet been accessed or played, is positioned in the leftmost position of the strand 70. The second position in the strand, such as corresponding to the second game tile 74, represents the most recently accessed or played game. The third game tile 76 represents the next most recently accessed or played game; the fourth game tile 78 represents the third most recently accessed or played game, and so on. After game tiles 74-78 associated with recently played games, game tiles 80-86 corresponding to game recommendations are displayed.

The game tiles 80-86 may be sorted according to a recommendation score, such as a user rating obtained from users of a social network, e.g., a friend network, associated with a user of the underlying user interface software discussed herein. Game ratings may be obtained directly from websites that provide game rating scores, or rating scores may be calculated by the underlying software based on frequency of use of a user's social network friends, and so on. Game recommendations may also be based on other factors, such as similarities of recommended games with games or types of games that a user most frequently uses, and so on. Additional game recommendations may be provided by commercial entities (e.g., via entity-specific recommendation algorithms), such as SOLS, and presented via one or more tiles, such as the eighth game tile 86.

Exact methods for sorting the tiles 72-86 of the strand may vary without departing from the scope of the present teachings. For example, in certain implementations, a most recently played game may appear ahead of a downloaded game that has not been played, even if the downloaded game was downloaded more recently than that recently played game was played. Furthermore, in certain implementations, for example, a downloaded game (i.e., tile corresponding thereto) that was downloaded three weeks ago may still appear ahead of a game that was played three hours ago. In other implementations, a tile of a recently downloaded game may only appear in the left most position without being played for a predetermined time interval. Furthermore, user options for enabling changing a sorting rule; for manually positioning tiles, and so on, may be provided, without departing from the scope of the present teachings.

Note that while certain game tiles shown in the strand 70 may correspond to a single game, it is possible that certain game tiles may correspond to groups of games, such as groups of games recommended based on social network analysis or groups of games recommended via a commercial entity. User selection of a tile corresponding to a group of games may invoke display of a user interface display screen that presents games of a group via tiles (such as a horizontal or vertical strand) or menu options to enable access to individual games of the group of games.

Note that while the strand 70 shows eight game tiles, that more or fewer tiles may be present, and that any additional tiles may be accessed via scrolling of the strand 70. Furthermore, sizes of tiles and relative spacings may also be varied. Furthermore, the tiles may be staggered or overlapped or otherwise arranged differently than shown in FIG. 3, without departing from the scope of the present teachings.

In the present specific embodiment, user selection of one of the tiles 72-86, such as via a touch screen tap gesture, may trigger a change in the background game artwork 62 reflective of the cover art of the selected game tile. A two-finger tap gesture outside of the strand 70 may trigger display of the first user interface display screen 40 of FIG. 2 and accompanying main menu 42. A two-finger horizontal swipe applied to the strand 70 may trigger display of a different strand, such as a strand for accessing electronic books and related content. A single tap gesture outside of the region defined by the strand 70 may trigger backward navigation to a most recently viewed user interface display screen, such as the user interface display screen 40 of FIG. 2.

Note that various gestures used to control user interface display features discussed herein may vary depending upon the implementation. For example, implementations of embodiments discussed herein may be run on computers that do not have a touch screen. In these cases, mouse controls or other user input mechanisms may be employed to navigate user interface display screens and access various functionality associated therewith.

Figure 4:
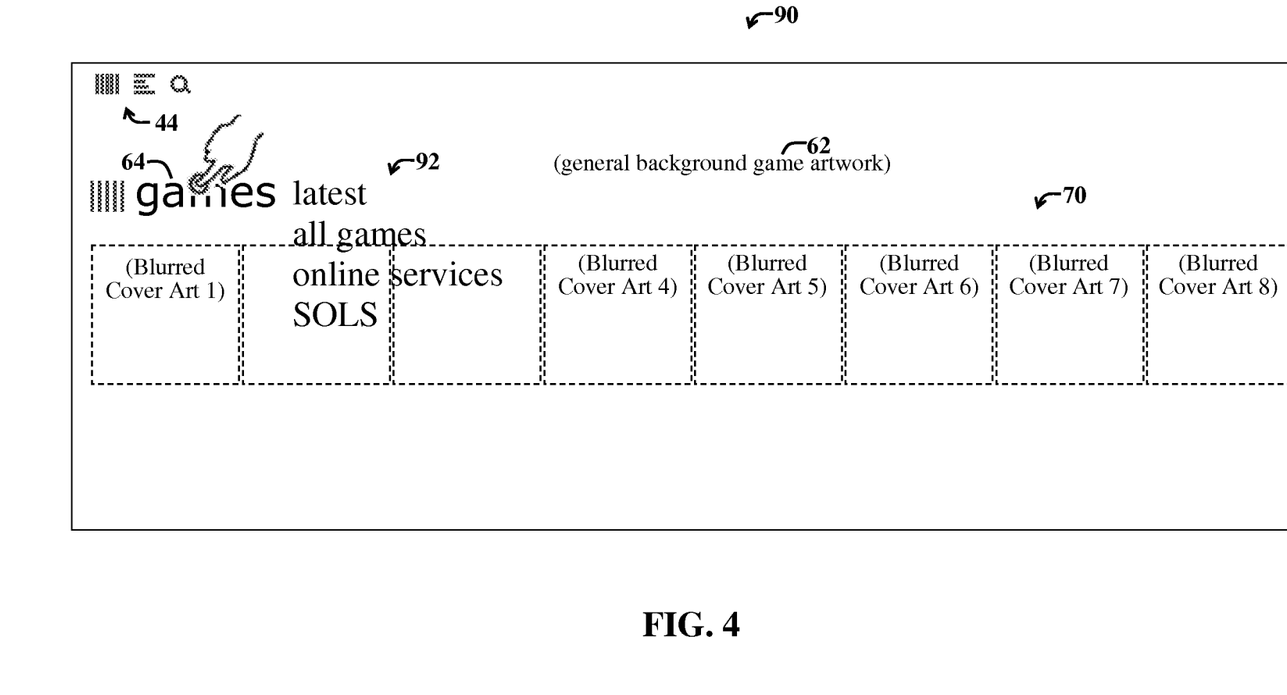
FIG. 4 is a diagram illustrating a third example user interface display screen showing a games menu, which is accessible by selecting a game header of the strand of FIGS. 3-4.

FIG. 4 is a diagram illustrating a third example user interface display screen 90 showing a games strand menu 92, which is accessible by selecting the game header 64 of the strand 70 of FIGS. 3-4. The selection may be performed via a single finger tap gesture or other gesture applied to the games header or elsewhere, depending upon the implementation. For example, in one implementation, a single finger tap on the games header 64 may activate the games strand menu 92, or a single finger tap and hold anywhere outside of the strand 70 a may activate the games strand menu 92.

In the present example embodiment, the strand 70 and accompanying cover art is blurred, as is the background art 62, coincidentally with display of the games strand menu 92. The menu 92 includes a transparent background, such that the text of the menu 92 appears to directly overlay a portion of the blurred strand 70.

Examples of user options provided via the game strand menu 92 include a user option to trigger display of only the latest or most recently played games, where the latest or most recently played games have been accessed within a certain predetermined time interval, e.g., two weeks, and/or in accordance with other recency criteria. Another option facilitates access to or display of tiles pertaining to all games that the underlying software has cataloged or is aware of. Another menu option includes an option to access one or more online services associated with one or more games or associated with a proprietor of the underlying user interface software. An example of an online service is customer service. Another menu option enable a user to access an online website associated with a commercial entity, such as a game seller, such as SOLS.

Note that various user options presented via the games strand menu 92 may vary. For example, additional menu items may be added or the menu items may be replaced with other menu items, without departing from the scope of the present teachings. For example, additional or alternative menu options include an option to access the last played game; a user option to access the last added or downloaded tame; and a user option to browse titles of games.

Figure 5:
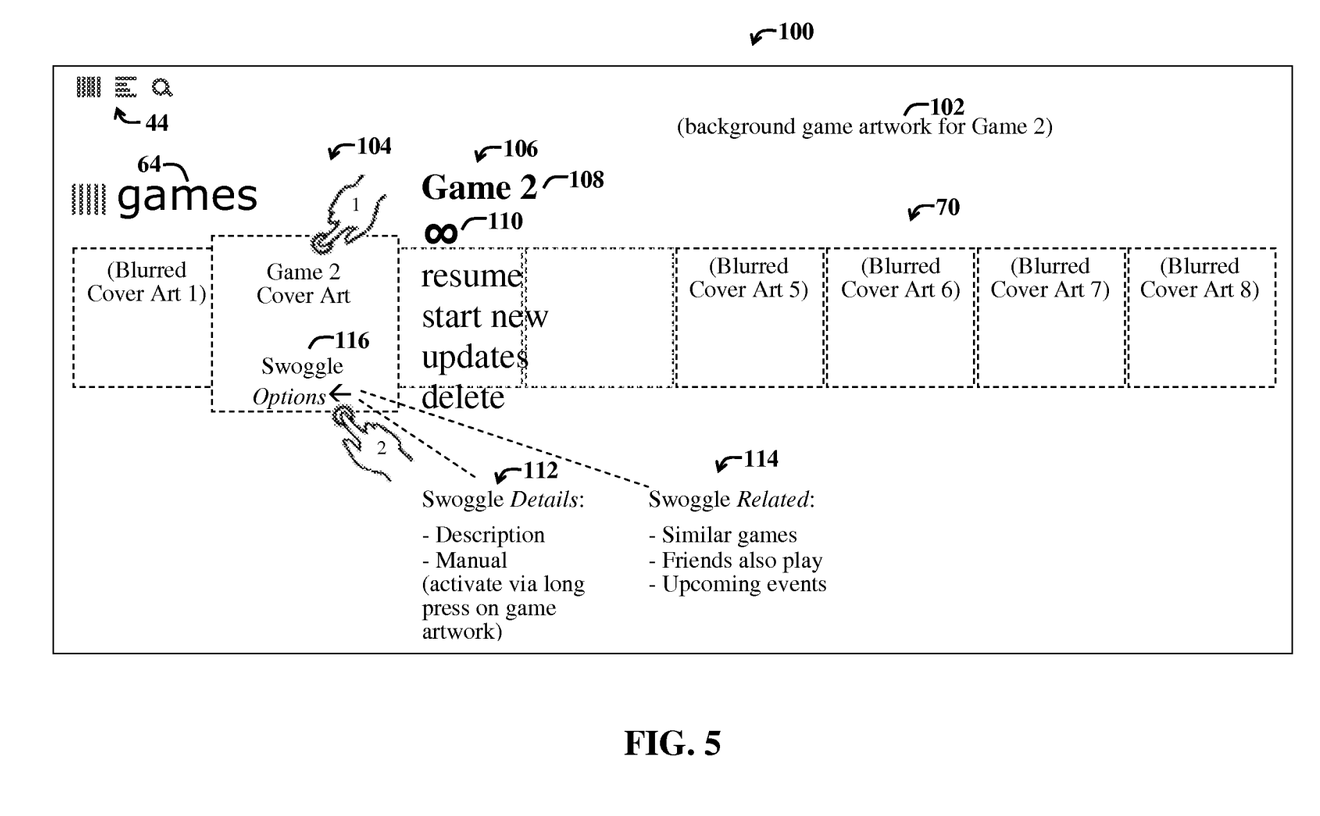
FIG. 5 is a diagram illustrating a fourth example user interface display screen showing a selected game tile and default options menu, which may be displayed in response to user selection of a game tile of the strand of FIGS. 3-5.

FIG. 5 is a diagram illustrating a fourth example user interface display screen 100 showing an example of a selected game tile 104 and default options menu 106, which may be displayed in response to user selection of a game tile (e.g., tile 74) of the strand of FIGS. 3-5. The selected game tile 104 represents an expanded or enlarged version of the second game tile 74 of FIG. 3 and may appear in response to a single finger tap gesture applied thereto.

Upon display of the expanded game tile 104, the options menu 106 appears. The expanded game tile 104 includes a swoggle user interface control 116, which is adapted to enable a user to change the displayed menu 106. A user may successively tap on the swoggle control 116 to successively change the displayed menu 106.

For illustrative purposes, additional menus 112, 114 are shown to illustrate how the menu 106 may be changed between menu types. However, in practice, only one of the menus 106, 112, 114 are displayed at a given time. The options menu 106 may be changed to show a details menu 112 or a "related" menu 114 in response to user selection of one of the menus 112, 114 via the swoggle user interface control 116.

For the purposes of the present discussion, a swoggle user interface control may be any user interface control that is adapted to change states in response to repeated selections thereof. Each state may, for example, be associated with display of a different menu or other different user interface features.

The example options menu 106, which is the default menu that appears in response to user selection of a game tile, includes a menu header 108, a pivot control 110, a resume option, a start new game option, a get updates option, and a delete tile or game option. User selection of the pivot option 110 may trigger display of metadata associated with a particular game. Metadata may be any data pertaining to or describing the game. Examples of metadata include manuals, information about game authors, information about music related to a game, and so on.

Figure 6:
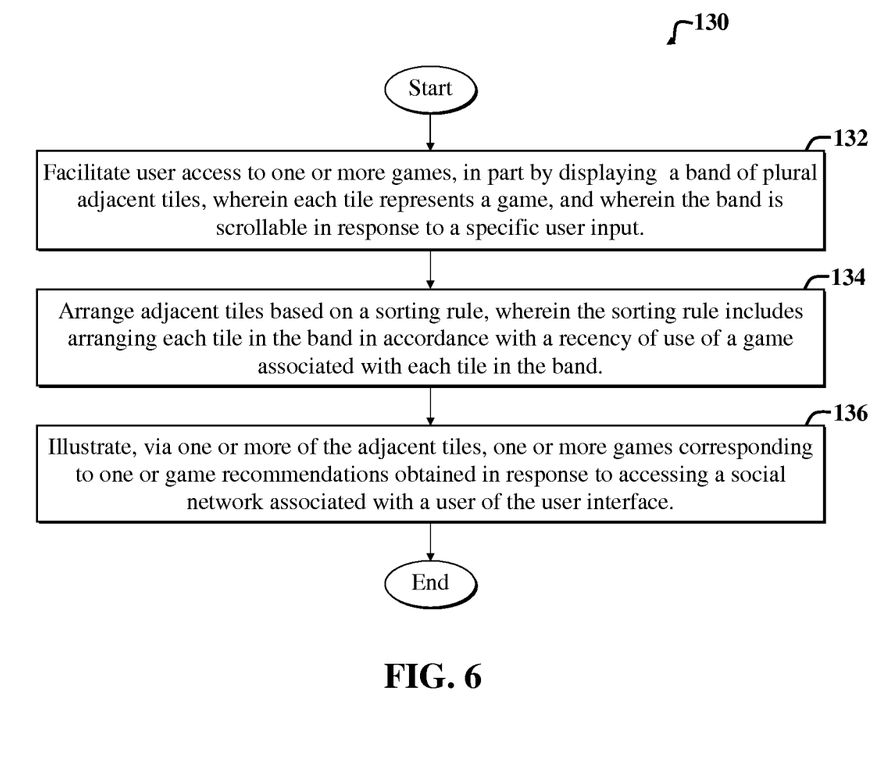
FIG. 6 is a flow diagram of an example method that is adapted for use with the embodiments of FIGS. 1-5.

FIG. 6 is a flow diagram of an example method 130 that is adapted for use with the embodiments of FIGS. 1-5. The example method includes a first step 132, which involves facilitating user access to one or more games in part by displaying a band of plural adjacent tiles, wherein each tile represents a game, and wherein the band is scrollable in response to a specific user input.

A second step 134 includes arranging adjacent tiles based on a sorting rule, wherein the sorting rule includes arranging each tile in the band in accordance with a recency of use of a game associated with each tile in the band.

A third step 136 includes illustrating, via the adjacent tiles, one or more games corresponding to one or game recommendations obtained in response to accessing a social network associated with a user of the user interface.

Note that various steps 132-136 of the method 130 may be interchanged, augmented, or omitted without departing from the scope of the present teachings. For example, in certain implementations, the step of providing one or more game recommendations by accessing a social network may be replaced with providing one or more game recommendations based on user game playing habits or usage patterns, based on user purchase patterns, and so on.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Although the description has been described with respect to particular embodiments thereof, these particular embodiments are merely illustrative, and not restrictive. For example, while certain touch gestures are employed to provide inputs to a touch screen to interact with a graphical user interface, gestures other than those discussed may be employed, and implementations that do not employ touch screens and touch gestures are possible.

Although a "band" or "strand" or other series or collection of tiles may be depicted having a particular shape, orientation or direction, it should be apparent that other arrangements are possible. For example, a band may have tiles presented in a particular direction such as left-to-right in the illustrations but is should be apparent that the band can also have the tiles presented or prioritized in a right-to-left manner. A band need not be horizontal but can be in vertical, diagonal, or other directions. Other variations are possible.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method for accessing games, the method comprising the following acts performed by an electronic computing device present at a first physical location:
    displaying a band of plural adjacent tiles on a display screen operably connected to the electronic computing device, wherein each tile represents a game, and wherein the displayed band includes a first group of tiles followed by a second group of tiles;
    arranging adjacent tiles within the first group based on a first sorting rule, wherein the first sorting rule includes spatially arranging each tile in the first group in the band in accordance with recency of download of the game represented by that tile, by a user; and
    arranging adjacent tiles within the second group based on a second sorting rule, wherein the second sorting rule includes spatially arranging each tile in the second group in the band in accordance with recency of access, play or opening, of the game represented by that tile, by a user;
    wherein each of the arrangement within the first group and the arrangement within the second group is determined independently of the first physical location.

2. The method of claim 1, wherein the band additionally includes a third group of tiles following the second group of tiles, each tile in the third group of tiles representing one or more games corresponding to one or more game recommendations obtained in response to accessing a social network associated with a user of the user interface.

3. The method of claim 1, further including presenting a first menu pertaining to the band in response to a first user input applied to a header or other region about the band.

4. The method of claim 3, wherein the plural adjacent tiles are arranged horizontally in the band.

5. The method of claim 4, wherein the second sorting rule includes positioning a most recently accessed game in a prominent position in the band.

6. The method of claim 5, wherein the prominent position includes the leftmost position.

7. The method of claim 5, wherein the second sorting rule includes positioning a downloaded but not accessed game in a leftmost position in the band, and positioning a most recently accessed game adjacent to the downloaded but not accessed game.

8. The method of claim 3, further including displaying a second menu pertaining to a particular selected a game in response to a second user input, wherein the second user input indicates user selection of a tile representing the game.

9. The method of claim 3, further including providing a first user option to access a collection of recommendations of electronic media based on one or more games that have been accessed by a user of the user interface.

10. The method of claim 9, further including providing one or more recommendations of one or more games based on a frequency of user access to one or more games accessible via the user interface.

11. The method of claim 9, further including providing one or more recommendations of one or more games based upon a rating of the one or more games, wherein the rating is derived from a social network employed by a user of the user interface.

12. The method of claim 9, further including obtaining the one or more recommendations from a commercial entity.

13. The method of claim 2, further including presenting each tile of the band of tiles with cover art pertaining to each game represented by a tile.

14. The method of claim 8, wherein second menu includes one or more user options for accessing metadata associated with a game.

15. The method of claim 14 further including providing a third user option to change the second menu, wherein the third user option is implemented via a swoggle user interface control.

16. The method of claim 14, further including providing, via the second menu, a user option to display identifications of games that members of a social network of a user have played.

17. The method of 14, further including providing, via the second menu, a user option to display identifications of games that are similar to a selected game.

18. The method of claim 14, further including activating an instance of a game in response to user selection of an enlarged tile resulting from user selection of a corresponding tile from the band of tiles.

19. An apparatus comprising:
a digital processor coupled to a display, present at a first physical location, and to a processor-readable storage device, wherein the processor-readable storage device includes one or more instructions executable by the digital processor to perform the following acts:
displaying a band of plural adjacent tiles on the display, wherein each tile represents a game, and wherein the band includes a first group of tiles followed by a second group of tiles;
arranging adjacent tiles within the first group based on a first sorting rule, wherein the first sorting rule includes spatially arranging each tile in the first group in the band in accordance with recency of download of the game represented by that tile, by a user; and
arranging adjacent tiles within the second group based on a second sorting rule, wherein the second sorting rule includes spatially arranging each tile in the second group in the band in accordance with recency of access, play or opening of the game represented by that tile, by a user;
wherein each of the arrangement within the first group and the arrangement within the second group is determined independently of the first physical location.

20. A processor-readable non-transitory storage device including instructions executable by a digital processor, the processor-readable non-transitory storage device including one or more instructions for:
displaying a band of plural adjacent tiles on a display screen, present at a first physical location and operably connected to the digital processor, wherein each tile represents a game, and wherein the band includes a first group of tiles followed by a second group of tiles;
arranging adjacent tiles within the first group based on a first sorting rule, wherein the first sorting rule includes spatially arranging each tile in the first group in the band in accordance with recency of download of the game represented by that tile, by a user; and
arranging adjacent tiles within the second group based on a second sorting rule, wherein the second sorting rule includes spatially arranging each tile in the second group in the band in accordance with recency of access, play or opening of the game represented by that tile, by a user;
wherein each of the arrangement within the first group and the arrangement within the second group is determined independently of the first physical location.

* * * * *